Patented Jan. 31, 1950

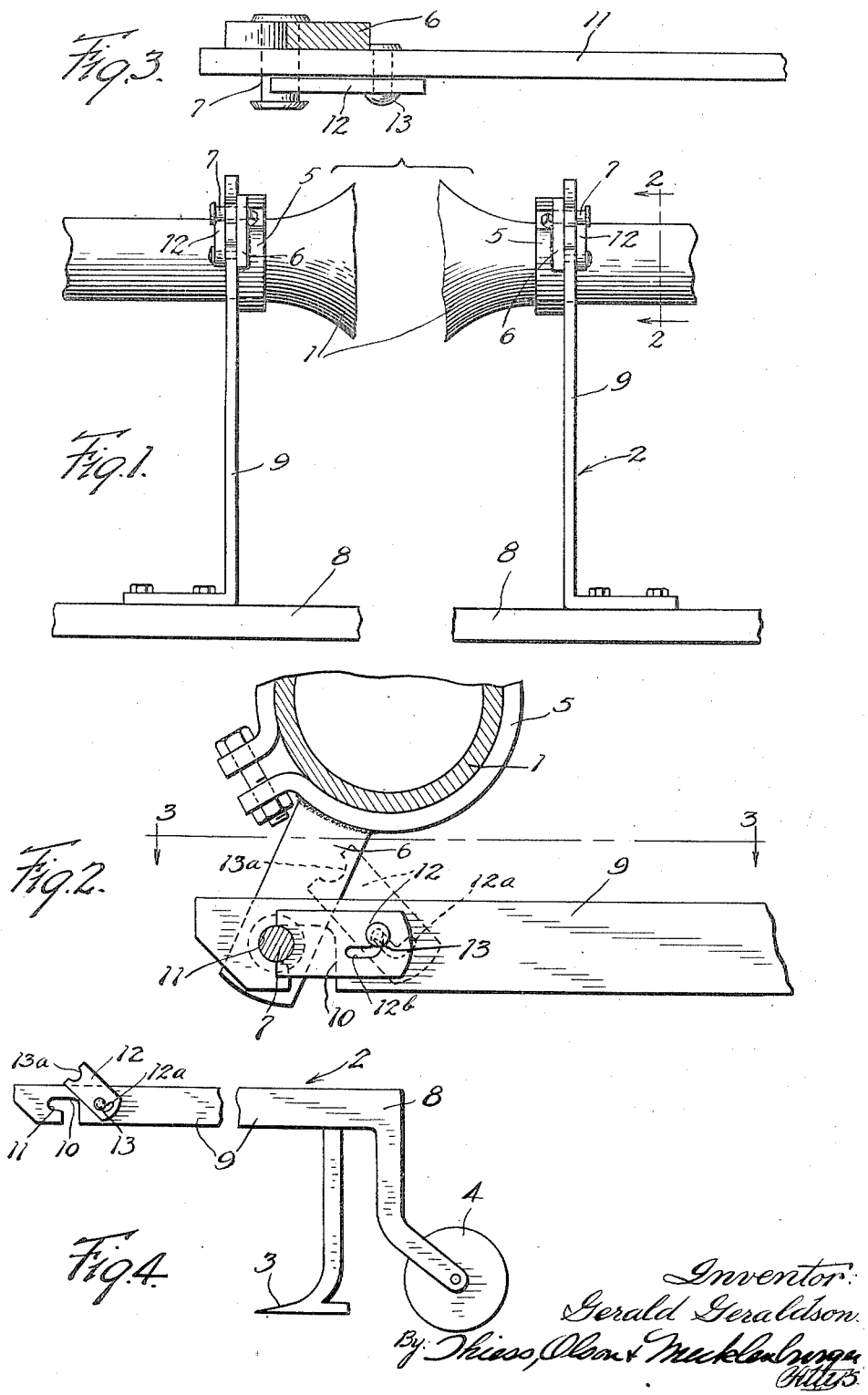

2,495,928

UNITED STATES PATENT OFFICE 2,495,928

HITCH AND DRAWBAR CONSTRUCTION FOR CULTIVATORS

Gerald Geraldson, Rockford, Ill., assignor to J. I. Case Company, Racine, Wis., a corporation of Wisconsin Application March 27, 1946, Serial No. 657,520

7 Claims. (Cl. 280—33.44)

My invention relates to a hitch and drawbar construction for cultivators or the like.

One of the objects of my invention is to provide a hitch and drawbar construction for connecting cultivators or the like, to be drawn by tractor, which will enable quick and easy attachment and detachment of the cultivator with respect to the tractor.

A further object of the invention is to provide such a construction in which means are provided for preventing accidental uncoupling of the hitch.

A further object of the invention is to provide such a construction which will be durable in use and inexpensive to manufacture.

Further objects and advantages of the invention will be apparent from the description and claims.

In the drawings, in which an embodiment of my invention is shown,

Figure 1 is a bottom plan view of a tractor hitch and associated parts embodying my invention;

Fig. 2 is a vertical section on the line 2—2 of Figure 1;

Fig. 3 is a horizontal section on the line 3—3 of Fig. 2; and

Fig. 4 is a side elevational view of the trailing frame and drawbar.

Referring to the drawings in detail, the construction shown comprises the rear axle housing 1 of a tractor and a trailing frame 2 on which may be mounted cultivator shovels 3, or the like, to be detachably secured to the tractor. The trailing frame 2 may be provided with a pair of wheels 4 for floatably supporting the frame as it is drawn along. In order to provide a connection for the trailing frame, a pair of split collars 5 are detachably secured to opposite sides of the axle housing 1. Each collar has a downwardly and forwardly extending arm 6 secured thereto, as by welding, and each arm has a laterally horizontally-extending hitch pin 7 secured thereto.

The trailing frame 2 comprises a crossbar 8 and a pair of drawbars 9 secured to the crossbar and extending forwardly for connection with the hitch pins 7. Each drawbar has an L-shaped downwardly-opening slot 10 therein, in a forward extension 11 of which the hitch pin 7 is received when the trailing carriage is connected.

Each drawbar is provided with a latch 12 having a slot providing a substantially vertical portion 12a and a substantially horizontal portion 12b within which slot is engaged a pivot pin 13.

Latch 12 has a recess 13a in the end thereof remote from pin 13, the recess fitting about a portion of pin 7. With pin 7 in position in extension 11, and pin 13 in slot portion 12b, latch 12 is swung down as seen in Fig. 3 and then pushed forward until recess 13a engages pin 7. In this position slot portion 12a comes into place above pin 13 and the rear portion of latch 12 drops. The parts are then locked in position until such time as the rear portion of latch 12 is lifted. Lifting of the rear end of latch 12 is not apt to happen except intentionally.

In connecting the trailing frame 2 with the latch pins 7, the frame is moved to a position in which the lower edges of the drawbars 9 will rest on the hitch pins, respectively, and the frame is then drawn rearwardly, the lower edges of the drawbars riding on the hitch pins. When the downwardly-opening portion of the slots 10 in the drawbar come into registration with the hitch pins, the drawbars will drop down, moving the latches 12 upwardly if they are in the way of the hitch pins. Further rearward movement of the trailing frame will bring the hitch pins into the forwardly-extending portions 11 of the slots and the latch 12 will then be positioned as above described to latch the frame securely to the tractor.

Further modifications will be apparent to those skilled in the art and it is desired, therefore, that the invention be limited only by the scope of the appended claims.

Having thus described my invention, what I claim and desire to secure by Letters Patent is:

1. A hitch and drawbar construction for cultivators, or the like, comprising a pair of split collars for clamping around the rear axle housing of a tractor, each collar carrying a laterally and horizontally extending hitch pin and a trailing frame to be detachably secured to and pulled along by said pins comprising a crossbar and a pair of drawbars extending forwardly from said crossbar, each drawbar having a downwardly opening slot therein having a forwardly-extending portion to receive one of said hitch pins.

2. A hitch and drawbar construction for cultivators, or the like, comprising a pair of split collars for clamping around the rear axle housing of a tractor, each collar carrying a laterally and horizontally extending hitch pin and a trailing frame to be detachably secured to and pulled along by said pins comprising a crossbar and a pair of drawbars extending forwardly from said crossbar, each drawbar having a downwardly opening slot therein having a forwardly-extending portion to receive one of said hitch pins and carrying a pivoted latch member which drops in behind said pin when the pin is in the forward portion of the slot.

3. A hitch and drawbar construction for cultivators, or the like, comprising a pair of split collars for clamping around the rear axle housing of a tractor, each collar carrying a laterally and horizontally extending hitch pin and a trailing frame to be detachably secured to and pulled along by said pins comprising a crossbar and a pair of drawbars extending forwardly from said crossbar, each drawbar having a downwardly opening slot therein having a forwardly-extending portion to receive one of said hitch pins and carrying a pivoted latch member which drops in behind said pin when the pin is in the forward portion of the recess, said latch having a stop extension for engagement with said pin to retain the latch in latching position.

4. A hitch and drawbar construction for cultivators or the like comprising a pair of laterally and horizontally extending hitch pins and a trailing frame to be detachably secured to and pulled along by said pins comprising a crossbar and a pair of drawbars extending forwardly from said crossbar, each drawbar having a downwardly-opening slot therein having a forwardly-extending portion to receive one of said hitch pins and carrying a pivoted latch member which drops in behind said pin when the pin is in the forward portion of the recess.

5. A hitch and drawbar construction for cultivators or the like comprising a pair of laterally and horizontally extending hitch pins and a trailing frame to be detachably secured to and pulled along by said pins comprising a crossbar and a pair of drawbars extending forwardly from said crossbar, each drawbar having a downwardly-opening slot therein having a forwardly-extending portion to receive one of said hitch pins and carrying a pivoted latch member which drops in behind said pin when the pin is in the forward portion of the recess, said latch having a stop extension for engagement with said pin to retain the latch in latching position.

6. A hitch and drawbar construction for cultivators or the like for use with a tractor having a pair of laterally and horizontally extending hitch pins comprising a trailing frame to be detachably secured to and pulled along by said pins comprising a connector and a pair of drawbars extending forwardly from said connector, each drawbar having a downwardly-opening slot therein having a forwardly-extending portion to receive one of said hitch pins and carrying a pivoted latch member which drops in behind said pin when the pin is in the forward portion of the recess.

7. A hitch and drawbar construction comprising a horizontally and laterally extending hitch pin and a drawbar having a generally horizontal slot therein having a downwardly open entrance opening for the hitch pin adjacent its rear end and having a forwardly-extending portion to receive the hitch pin and carrying a latch member having a pin and slot connection with said bar and having a notch in its forward edge for embracing said hitch pin, said slot having a portion extending from front to rear and thence upwardly whereby in unlatching the rear end of the latch may be lifted to enable the latch to be drawn rearwardly out of engagement with said hitch pin.

GERALD GERALDSON.

REFERENCES CITED

The following references are of record in the file of this patent:

UNITED STATES PATENTS

| Number | Name | Date |
| --- | --- | --- |
| 1,973,766 | Johnson | Sept. 18, 1934 |
| 2,053,255 | Ferguson et al. | Sept. 8, 1936 |
| 2,057,655 | Anthony et al. | Oct. 20, 1936 |